UNITED STATES PATENT OFFICE.

FEODOR LEHMANN AND JOHANNES STOCKER, OF BERLIN, GERMANY.

PROCESS FOR MANUFACTURING LACS FROM DERIVATIVES OF CELLULOSE.

1,185,514.     Specification of Letters Patent.     Patented May 30, 1916.

No Drawing.     Application filed April 13, 1914. Serial No. 831,617.

*To all whom it may concern:*

Be it known that we, FEODOR LEHMANN and JOHANNES STOCKER, subjects of the German Emperor, and residents of Berlin, Germany, have invented certain new and useful Improvements in Processes for Manufacturing Lacs from Derivatives of Cellulose, of which the following is a specification.

The invention relates to a process for manufacturing lacs from derivatives of cellulose.

The process consists in dissolving the derivatives of cellulose in suitable liquids such as methyl alcohol, acetone oil, ketones or the like after having previously added a benzol-, alcohol- or the like solution of polymerization products of cumarone or indene or a mixture of both or the resinous substances obtained when refining tar oils, (the so called cumarone resin) or equivalent or similar products, (which polymerization products may be previously purified if necessary). In carrying out said process, the so called cumarone resin is to be considered in the first instance; it is produced when refining benzol hydrocarbons and mainly composed of a mixture of the products of polymerization of cumarone and indene. A lac is obtained which flows like oil, is bright, dries uniformly, is highly elastic and air- and light-proof.

When derivatives of cellulose are dissolved in the first named liquids, a clear solution is obtained, but after drying a white opaque layer is left remaining; when the mentioned products of polymerization of the cumarone and indene have been added, not only the above cited advantages are secured, but said layer keeps clear as water after drying. Consequently the adding of the products of polymerization of the cumarone and indene is not a question of providing an equivalent substitute for the resins heretofore used in manufacturing lacs, but a surprising novel fact occurs, consisting in that the products of polymerization of the cumarone, and indene provide, when used with the derivatives of cellulose, new compounds, unknown before as industrial products and having very valuable technical properties.

*Examples.*

I. 10 grams of cumarone resin are dissolved in 50 grams of benzol and added to a liquid composed of a solution of 30 grams of collodion cotton 5 grams of acetone-oil, 100 grams of alcohol and 100 grams of ketones. The resulting liquid mass is diluted with 300 grams of alcohol, 300 grams of benzin and 100 grams of methyl alcohol.

II. 10 grams of cumarone resin are dissolved in a mixture of 25 grams of fusel-oil and 25 grams of tetra-chlorethane. Said mixture is added to a mixture of 600 grams of acetone and 300 grams of methylic alcohol. 40 grams of acetylcellulose are then dissolved in the resulting liquid mixture.

Of course the above proportions are only given by way of example; they vary between large limits according to the desired properties of the lacs to be manufactured.

Having now fully described our said invention, what we claim and desire to secure by Letters Patent, is:

1. Process for manufacturing lacs from derivatives of cellulose consisting in adding to said derivatives compounds of cumarone and indene polymerization products.

2. Process for manufacturing lacs from derivatives of cellulose consisting in adding to said derivatives the resinous cumarone containing substances obtained when refining tar oils.

3. A process for manufacturing lacs from derivatives of cellulose which consists in adding to said derivatives a solution of cumarone and indene polymerization products in acetone oil, and subsequently diluting said solution with benzol.

4. A process for manufacturing lacs from derivatives of cellulose which consists in adding to said derivatives a solution of cumarone and indene polymerization products in a ketone, and subsequently diluting said solution with benzol.

5. Process for manufacturing lacs which consists in dissolving derivatives of cellulose and cumarone and indene polymerization products in a solvent and subsequently diluting the solution.

In testimony whereof we have hereunto set our hands in presence of two witnesses.

FEODOR LEHMANN.
                JOHANNES STOCKER.

Witnesses:
   WOLDEMAR HAUPT,
   HENRY HASPER.